United States Patent
Lee et al.

(10) Patent No.: US 8,768,511 B2
(45) Date of Patent: Jul. 1, 2014

(54) OBJECT SEARCHING SYSTEM, OBJECT SEARCHING METHOD, AND CLEANING ROBOT

(75) Inventors: Hou-Hsien Lee, New Taipei (TW); Chang-Jung Lee, New Taipei (TW); Chih-Ping Lo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 304 days.

(21) Appl. No.: 13/207,679

(22) Filed: Aug. 11, 2011

(65) Prior Publication Data

US 2012/0297559 A1 Nov. 29, 2012

(30) Foreign Application Priority Data

May 27, 2011 (TW) .............................. 100118565 A

(51) Int. Cl.
 *B08B 7/00* (2006.01)
 *G05B 15/00* (2006.01)
(52) U.S. Cl.
 USPC ............... 700/253; 700/250; 700/258; 901/1; 901/47

(58) Field of Classification Search
 USPC ........ 700/245, 250, 253, 255, 258; 901/1, 46, 901/47; 15/3, 319, 340.1, 340.3, 340.4
 See application file for complete search history.

(56) References Cited

U.S. PATENT DOCUMENTS

| | | | |
|---|---|---|---|
| 2004/0088080 A1* | 5/2004 | Song et al. | 700/259 |
| 2005/0288079 A1* | 12/2005 | Tani | 463/1 |
| 2007/0250212 A1* | 10/2007 | Halloran et al. | 700/245 |
| 2010/0234998 A1* | 9/2010 | Kim | 700/259 |
| 2011/0138550 A1* | 6/2011 | Park | 15/21.1 |
| 2012/0173070 A1* | 7/2012 | Schnittman | 701/26 |
| 2013/0151061 A1* | 6/2013 | Hong et al. | 701/25 |

* cited by examiner

*Primary Examiner* — Jason Holloway
(74) *Attorney, Agent, or Firm* — Novak Druce Connolly Bove + Quigg LLP

(57) ABSTRACT

An object searching method includes: capturing an image in front of a cleaning robot by a camera. Comparing the image with a number of reference images to determine whether the image is the same as one of the reference images. Storing a position of the cleaning robot and the image when the image is the same as one of the reference images, adjusting the path of the cleaning robot to stop the cleaning robot from cleaning the object; and emitting an alarm.

5 Claims, 4 Drawing Sheets

OBJECT SEARCHING SYSTEM, OBJECT SEARCHING METHOD, AND CLEANING ROBOT

BACKGROUND

1. Technical Field

The present disclosure relates to a cleaning robot, particularly to a cleaning robot including an object searching system and an object searching method.

2. Description of Related Art

Many cleaning robots can sweep the room according to commands preset by a user. However, the cleaning robot may not be able to find a non-trash object when the cleaning robot is cleaning the room.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
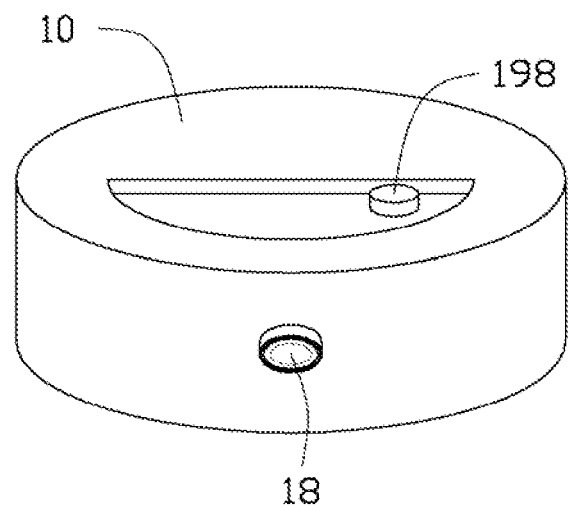
FIG. 1 is a schematic diagram of an exemplary embodiment of a cleaning robot.
Figure 2:
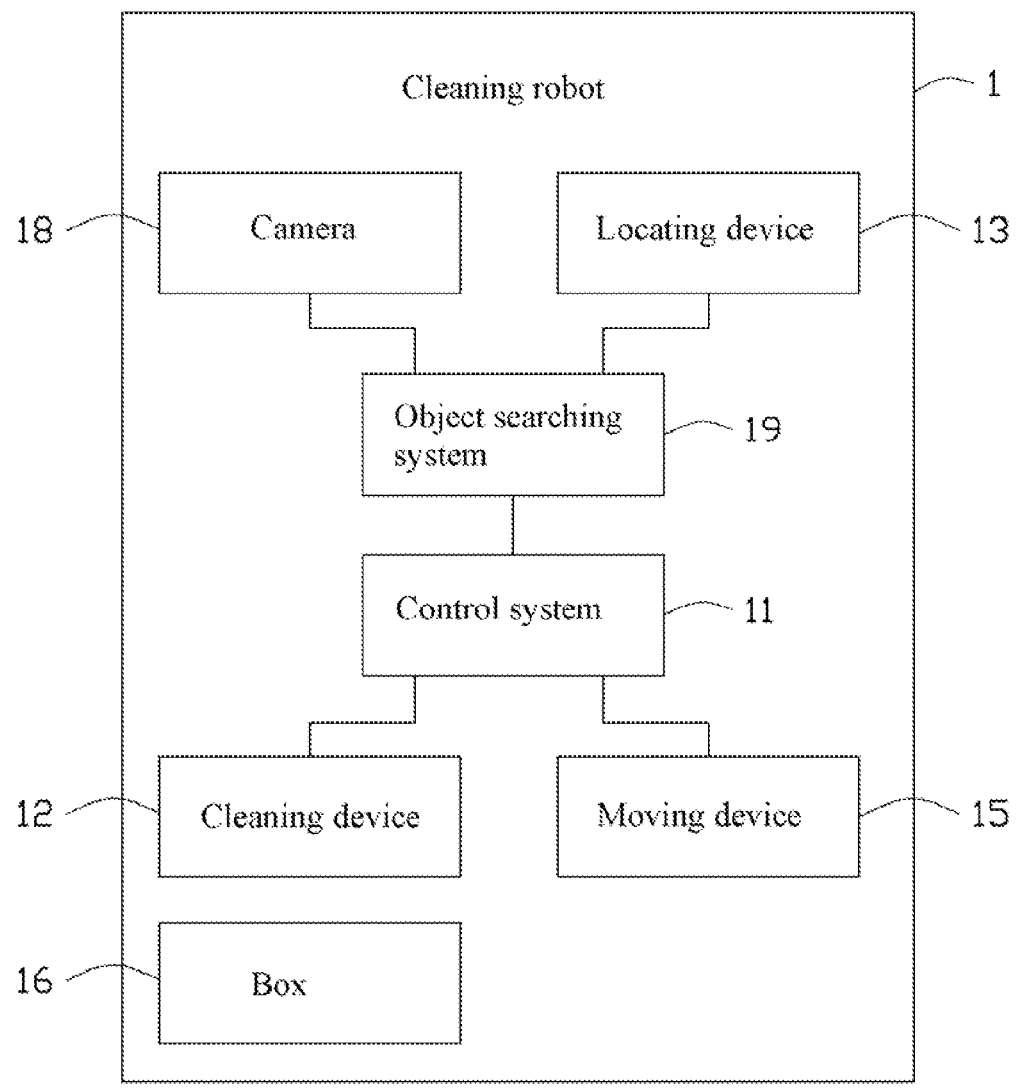
FIG. 2 is a block diagram of the cleaning robot of FIG. 1, wherein the cleaning robot includes an object searching system.

Referring to FIGS. 1 and 2, an exemplary embodiment of a cleaning robot 1 includes a chassis 10, a control system 11, a cleaning device 12, a moving device 15, a box 16, a camera 18, an object searching system 19, and a locating device 13.

The chassis 10 is to cover the control system 11, the cleaning device 12, the moving device 15, and the box 16. The cleaning device 12 may be a brush for cleaning the floor. The moving device 15 may include a motor, and wheels driven by the motor to move the cleaning robot 1. The control system 11 is used to set a path and time, and controls the cleaning device 12 and the moving device 15 according to the path and the time. The box 16 is used to store dirt.

The camera 18 is mounted on the chassis 10 to capture an image in front of the cleaning robot 1. The locating device 13 tracks a location of the cleaning robot 1. In the embodiment, the moving motions of the cleaning robot 1 can be regarded as how the cleaning robot 1 arrives at the present location from a starting point. For example, the cleaning robot 1 first goes one meter forward, then turns left and goes one meter forward, and at last, turns left and goes two meters forward. At this condition, a present location of the cleaning robot 1 can be regarded as "go one meter forward, turn left and go one meter forward, turn left and go two meters forward".

Figure 3:
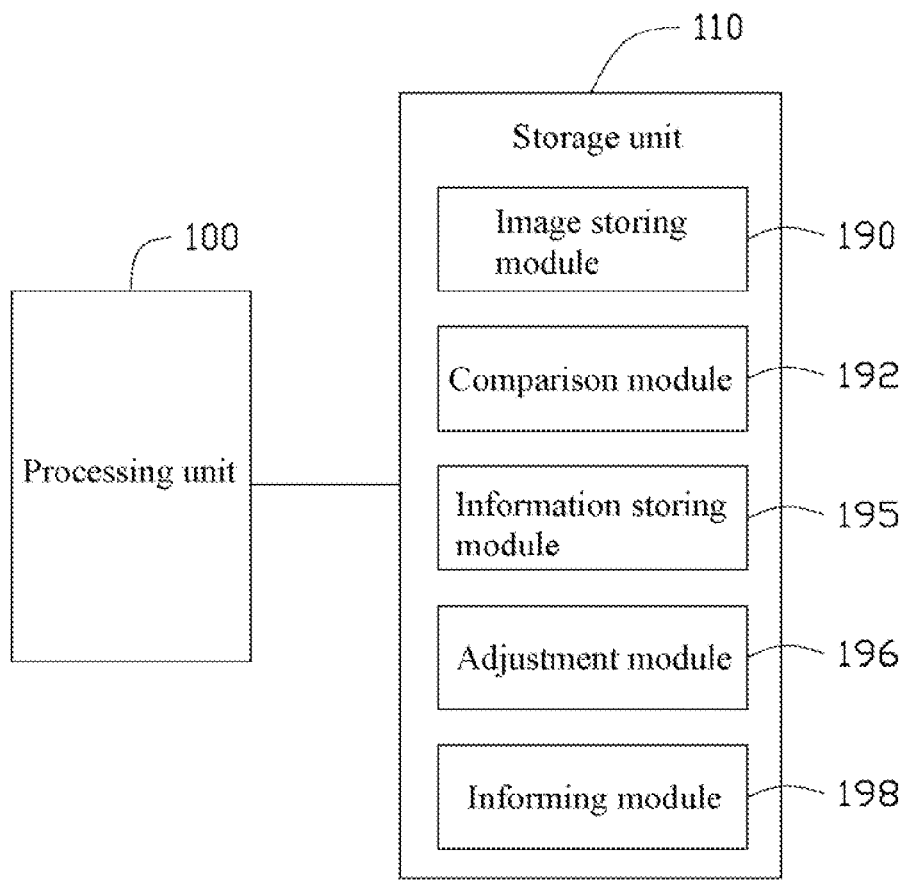
FIG. 3 is a block diagram of an exemplary embodiment of the object searching system of FIG. 2.

Referring to FIG. 3, the object searching system 19 includes a processing unit 100, and a storage unit 110. The storage unit 110 includes an image storing module 190, a comparison module 192, an information storing module 195, an adjustment module 196, and an informing module 198, which may include computer code to be executed by the processing unit 100.

The image storing module 190 stores a plurality of images of different objects. Each object corresponds to a plurality of images shot from different angles. The images are regarded as reference images. The different objects are regarded as important objects. Of course, users can add more images to the image storage module 190 or delete some images stored in the image storing module 190.

The comparison module 192 compares the image captured by the camera 18 with the reference images stored in the image storing module 190 to determine whether the image captured by the camera 18 is the same as one of the reference images stored in the image storing module 190.

If the image captured by the camera 18 is the same as one of the reference images stored in the image storing module 190, the information storing module 195 stores a position where the locating device 13 tracks at this time and the image captured by the camera 18.

In addition, if the image captured by the camera 18 is the same as one of the reference images stored in the image storing module 190, the adjustment module 196 adjusts the path of the cleaning robot 1 to stop the cleaning robot 1 from cleaning the object. Moreover, the informing module 198 informs the user, such as by emitting an alarm. In the embodiment, the informing module 198 may include a light-emitting diode and/or a buzzer. The user can check the position and the image stored in the information storing module 195 to find out the object.

If the user is not at home when the informing module 198 informs the user, the user can check the information stored in the information storing module 195 to determine whether the cleaning robot 1 has found an important object during the cleaning of the room after the user comes back. If the cleaning robot 1 has found an important object, the user can check the position and the image stored in the information storing module 195 to find the important object. Moreover, the cleaning robot 1 further includes a button. When the button is pressed, the control system 11 reads the position stored in the information storing module 195, and controls the moving device 15 to make the cleaning device 1 go to the position. As a result, the user can find the important object.

Figure 4:
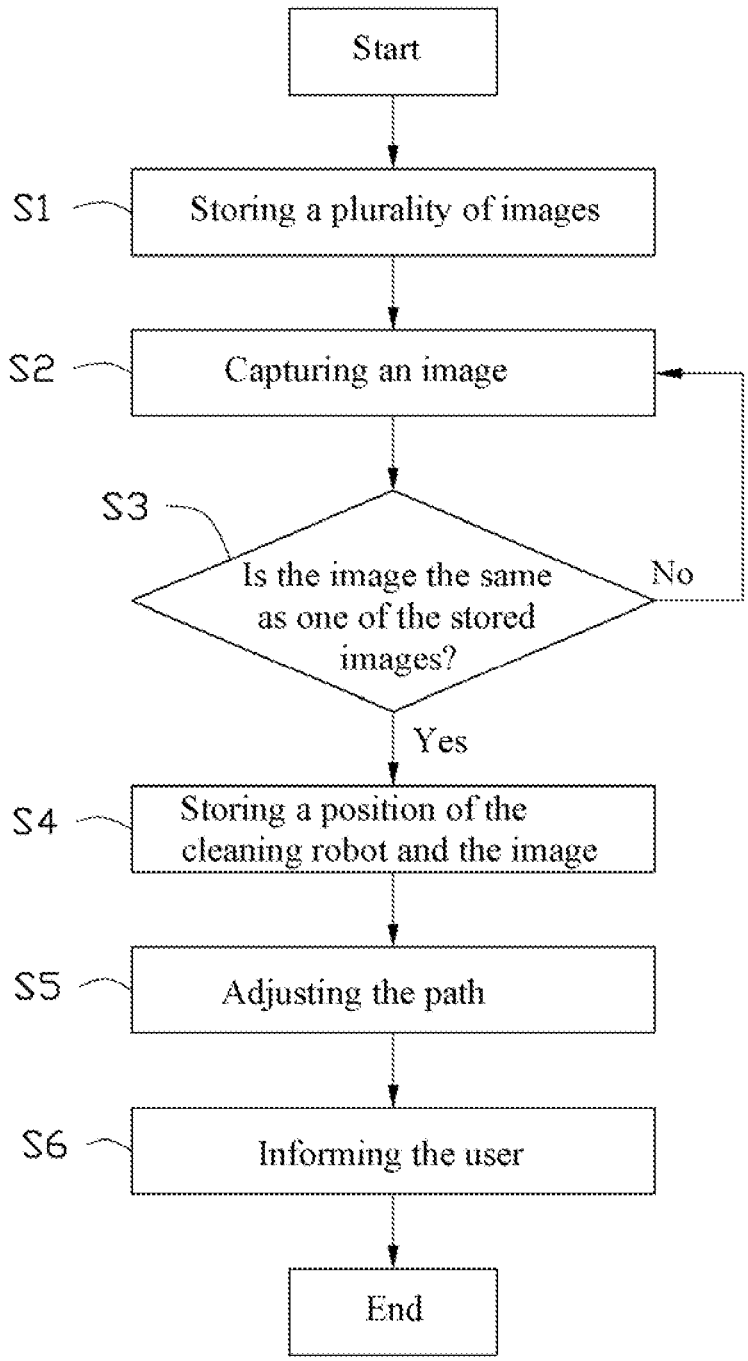
FIG. 4 is a flowchart of an exemplary embodiment of an object searching method.

Referring to FIG. 4, an exemplary embodiment of an object searching method includes the following steps.

In step S1, a plurality of images of different objects are stored in the image storing module 190. Each object corresponds to a plurality of images shot from different angles.

In step S2, the camera 18 captures an image in front of the cleaning robot 1.

In step S3, the comparison module 192 compares the image captured by the camera 18 with the images stored in the image storing module 190 to determine whether the image captured by the camera 18 is the same as one of the images stored in the image storing module 190. If the image captured by the camera 18 is the same as one of the images stored in the image storing module 190, it flows to step S4. If the image captured by the camera 18 is not the same as any image stored in the image storing module 190, it returns to step S2.

In step S4, the information storing module 195 stores a position where the locating device 13 is tracking at this moment and the image captured by the camera 18.

In step S5, the adjustment module 196 adjusts the path of the cleaning robot 1 to stop the cleaning robot 1 from cleaning the object.

In step S6, the informing module 198 informs the user.

The foregoing description of the exemplary embodiments of the disclosure has been presented only for the purposes of illustration and description and is not intended to be exhaustive or to limit the disclosure to the precise forms disclosed. Many modifications and variations are possible in light of everything above. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. An object searching system used for a cleaning robot, the object searching system comprising:
    a camera mounted on the cleaning robot configured to capture an image in front of the cleaning robot;
    a locating device mounted on the cleaning robot configured to track a location of the cleaning robot;
    a processing unit connected to the camera and the locating device; and
    a storage unit connected to the processing unit and storing a plurality of programs to be executed by the processing unit, wherein the storage unit comprises:
    a comparison module configured to compare the image captured by the camera with a plurality of reference images of different objects to determine whether the image captured by the camera is the same as one of the reference images;
    an information storing module, wherein when the image captured by the camera is the same as one of the reference images, the information storing module stores a location obtained by the locating device and the image captured by the camera;
    an adjustment module, wherein when the image captured by the camera is the same as one of the plurality of reference images, the adjustment module adjusts a path of the cleaning robot, which stops the cleaning robot from cleaning the object; and
    an informing module, wherein when the image captured by the camera is the same as one of the plurality of reference images, the informing module emits an alarm.

2. The system of claim 1, wherein the storage unit further comprises an image storing module configured to store the plurality of reference images of different objects, each object corresponds a plurality of images shot from different angles.

3. An object searching method used for a cleaning robot, the object searching method comprising:
    capturing an image in front of the cleaning robot by a camera;
    comparing the image captured by the camera with a plurality of reference images stored in a storage unit configured to determine whether the image captured by the camera is the same as one of the plurality of reference images, wherein the storage unit is non-transitory and connected to a processing unit of an electronic device, the storage unit stores a plurality of programs that, when executed by the processing unit, causes the electronic device to perform the steps of:
    storing a location of the cleaning robot obtained by a locating device and the image captured by the camera when the image captured by the camera is the same as one of the plurality of reference images;
    adjusting a path of the cleaning robot to stop the cleaning robot from cleaning the object when the image captured by the camera is the same as one of the plurality of reference images; and
    emitting an alarm when the image captured by the camera is the same as one of the plurality of reference images.

4. The method of claim 3, before the step comparing the image captured by the camera with a plurality of reference images further comprising:
    shooting a plurality of objects from different angles to obtain the plurality of reference images.

5. The method of claim 3, further comprising:
    reading the location stored and controlling the cleaning robot to move to the position.

* * * * *